C. E. ROBERTS.
MACHINE FOR BREAKING AND SCUTCHING HEMP AND OTHER FIBROUS MATERIAL.
APPLICATION FILED DEC. 7, 1918.

1,356,740.  Patented Oct. 26, 1920.
7 SHEETS—SHEET 1.

Witness:
Leaf Dutman

Inventor:
Charles E. Roberts
By Harry Irvin Cromer
Atty.

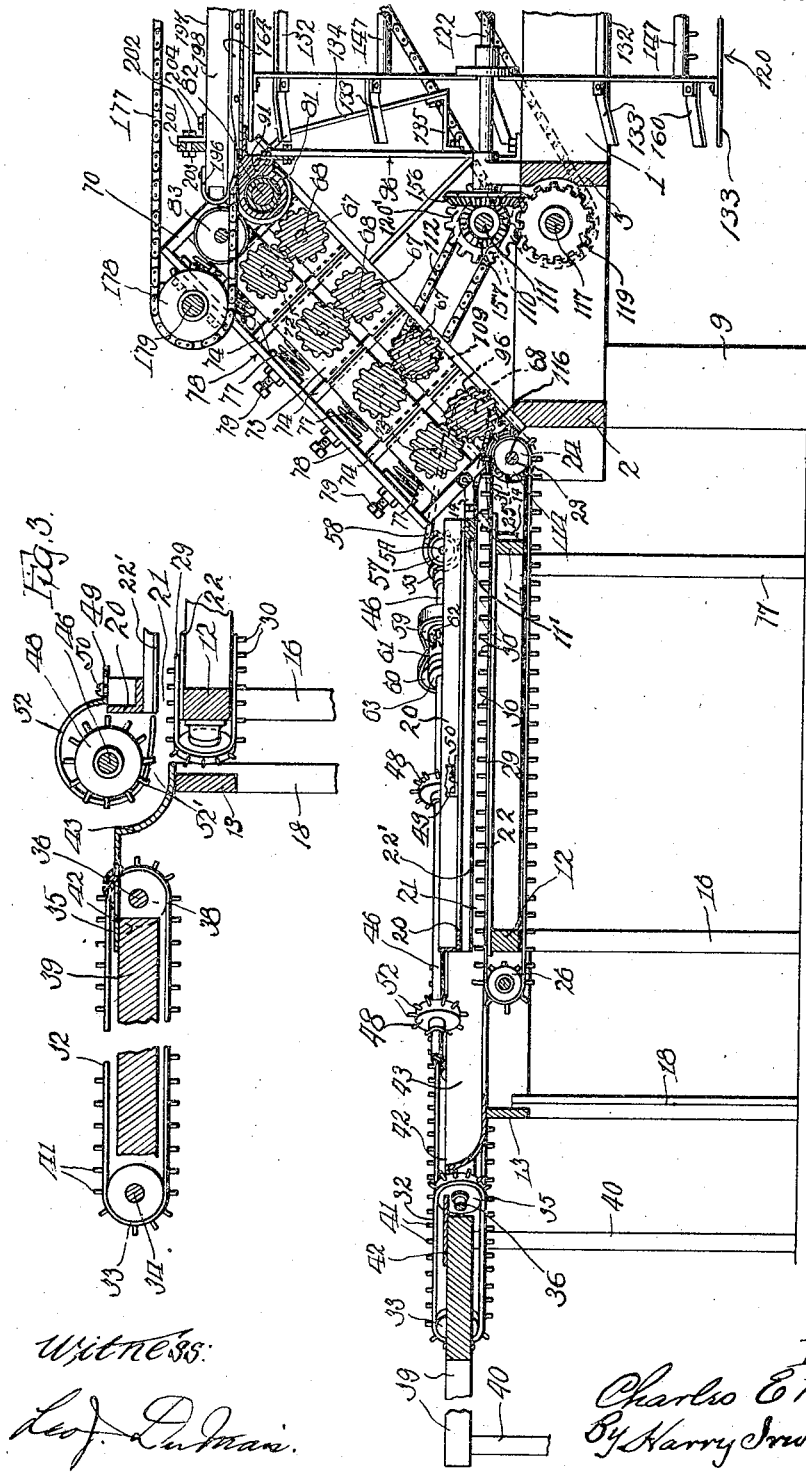

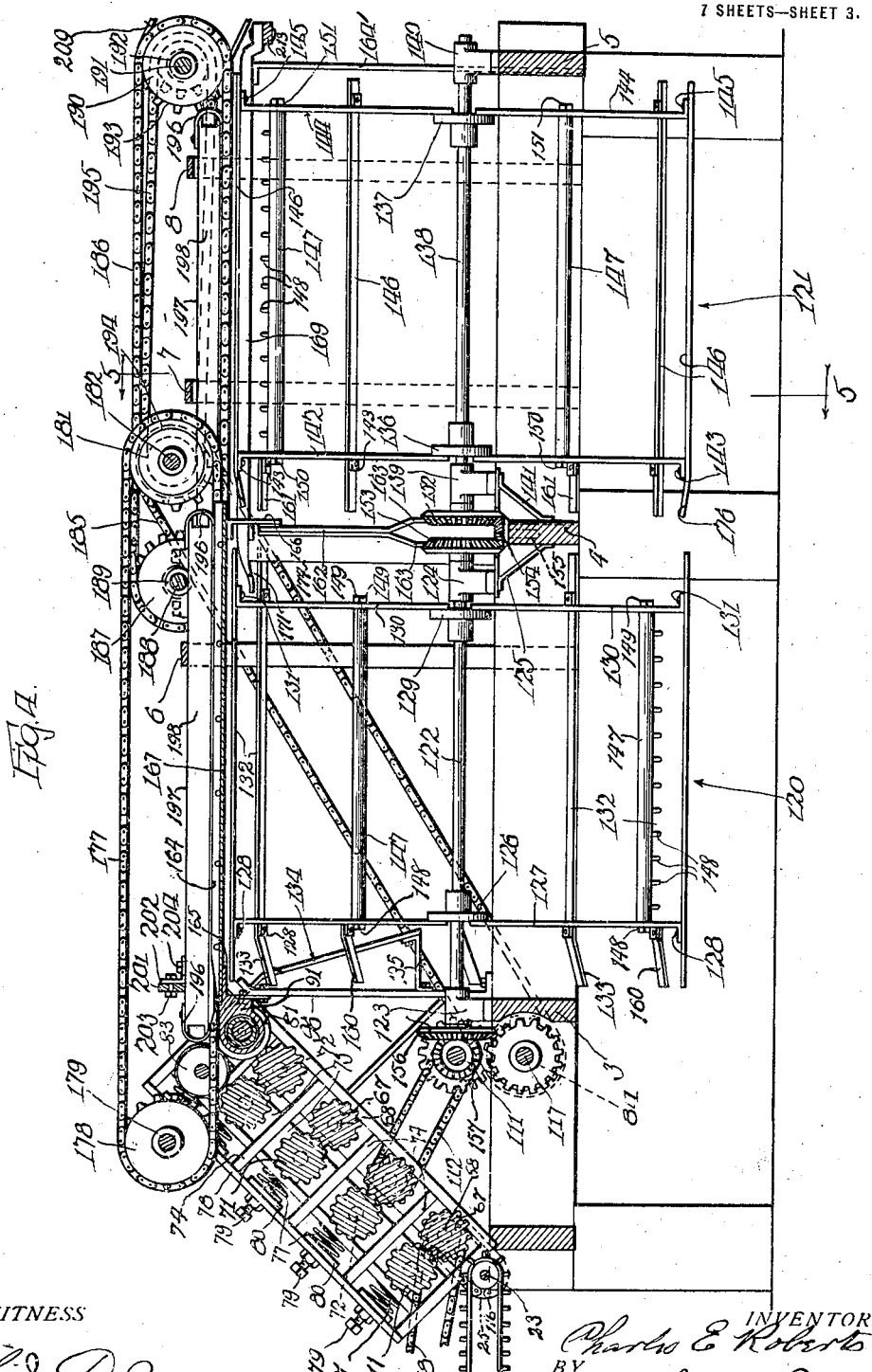

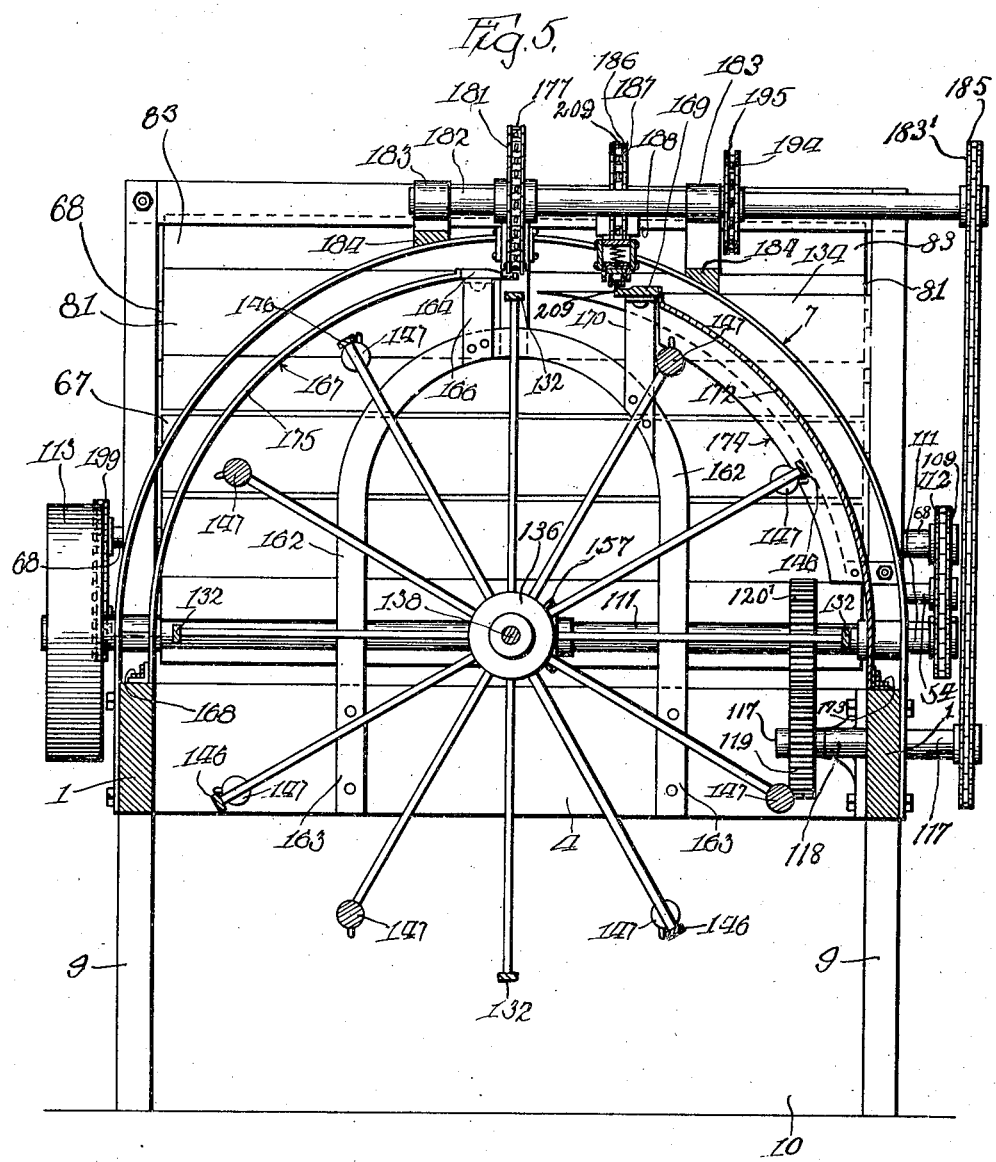

C. E. ROBERTS.
MACHINE FOR BREAKING AND SCUTCHING HEMP AND OTHER FIBROUS MATERIAL.
APPLICATION FILED DEC. 7, 1918.
1,356,740. Patented Oct. 26, 1920.
7 SHEETS—SHEET 5.
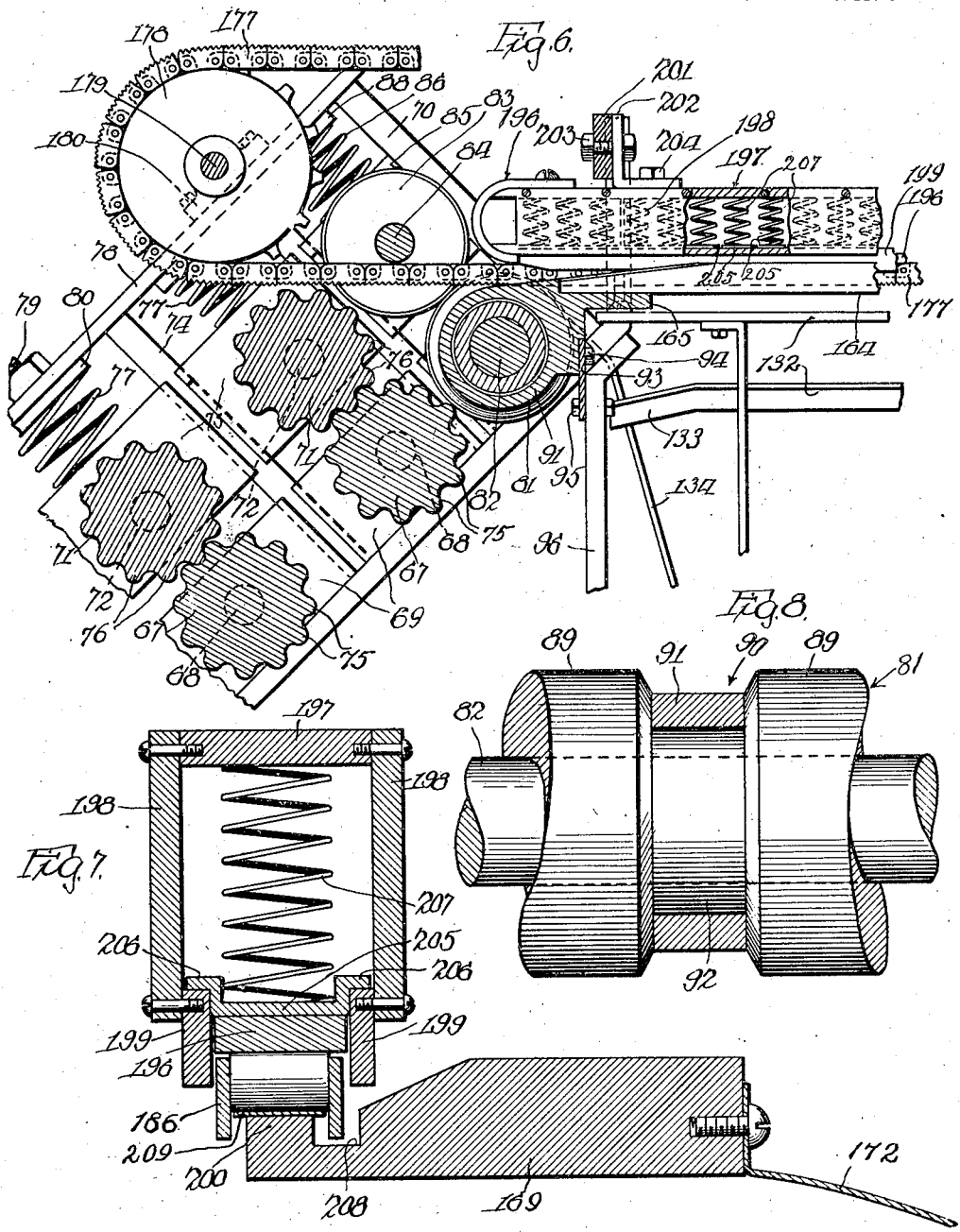

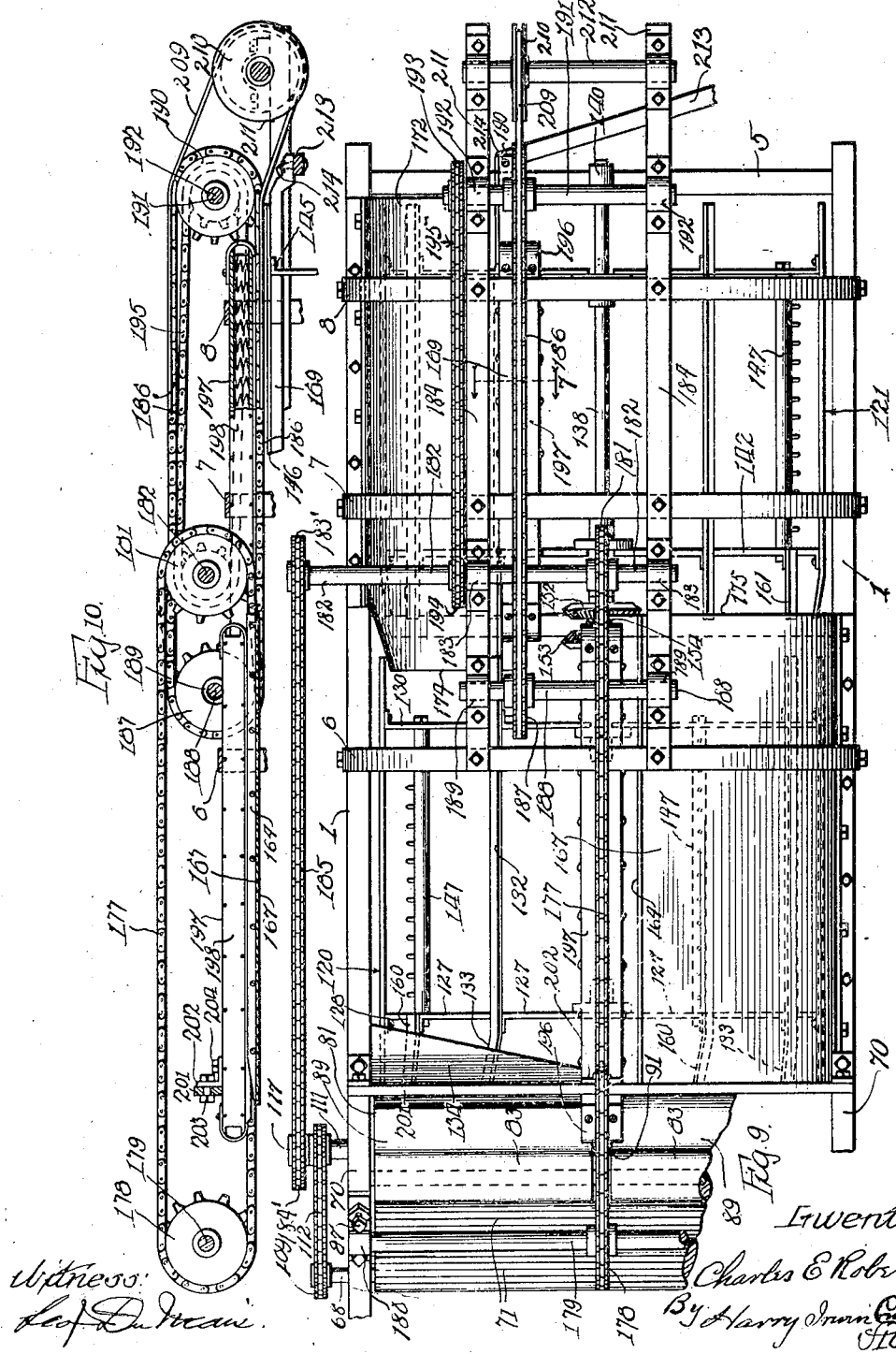

C. E. ROBERTS.
MACHINE FOR BREAKING AND SCUTCHING HEMP AND OTHER FIBROUS MATERIAL.
APPLICATION FILED DEC. 7, 1918.
1,356,740.
Patented Oct. 26, 1920.
7 SHEETS—SHEET 7.
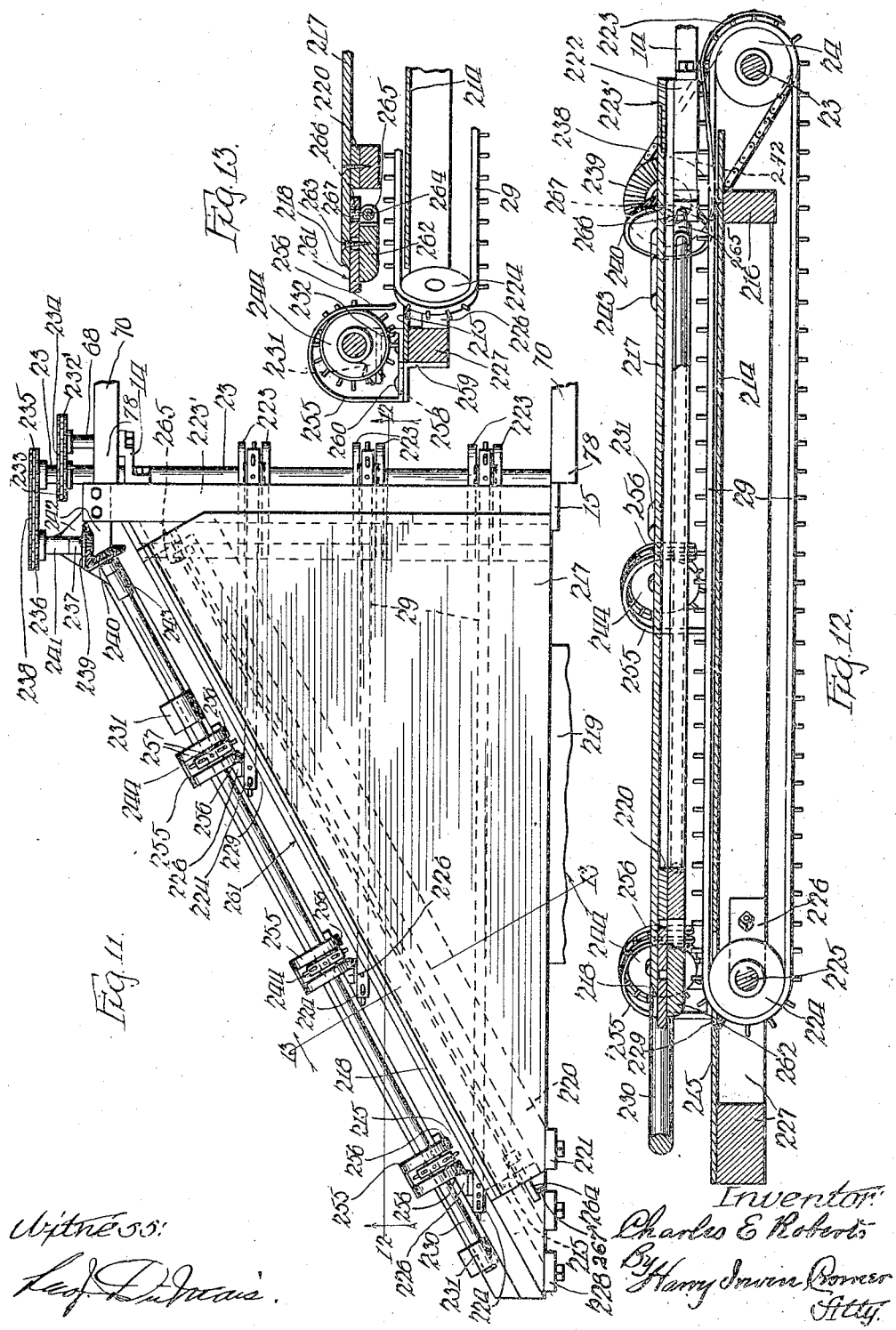

UNITED STATES PATENT OFFICE.

CHARLES E. ROBERTS, OF OAK PARK, ILLINOIS.

MACHINE FOR BREAKING AND SCUTCHING HEMP OR OTHER FIBROUS MATERIAL.

1,356,740.　　　　Specification of Letters Patent.　　Patented Oct. 26, 1920.

Application filed December 7, 1918. Serial No. 265,739.

*To all whom it may concern:*

Be it known that I, CHARLES E. ROBERTS, a citizen of the United States, residing in Oak Park, in the county of Cook and State of Illinois, have invented certain new and useful Improvements in Machines for Breaking and Scutching Hemp or other Fibrous Material, of which the following is a specification.

The principal object of this invention is to provide a simple, efficient and economical machine for breaking and scutching hemp.

Other and further objects of the invention will appear from the following description and claims, and the accompanying drawings.

The invention consists in the features, combinations, and details of construction, and arrangement of parts herein described and shown.

This application is a continuation of my copending application Serial No. 236,410, filed May 24, 1918, (which was a renewal of application Serial No. 43,785, filed Aug. 5, 1915) in so far as the subject matter in both applications are common or substantially the same; and I have not abandoned any invention disclosed in said former applications.

In the accompanying drawings:

Fig. 2 is a view in central longitudinal section of the mechanism shown in Fig. 1, taken on line 2 of said Fig. 1;

Figure 1:
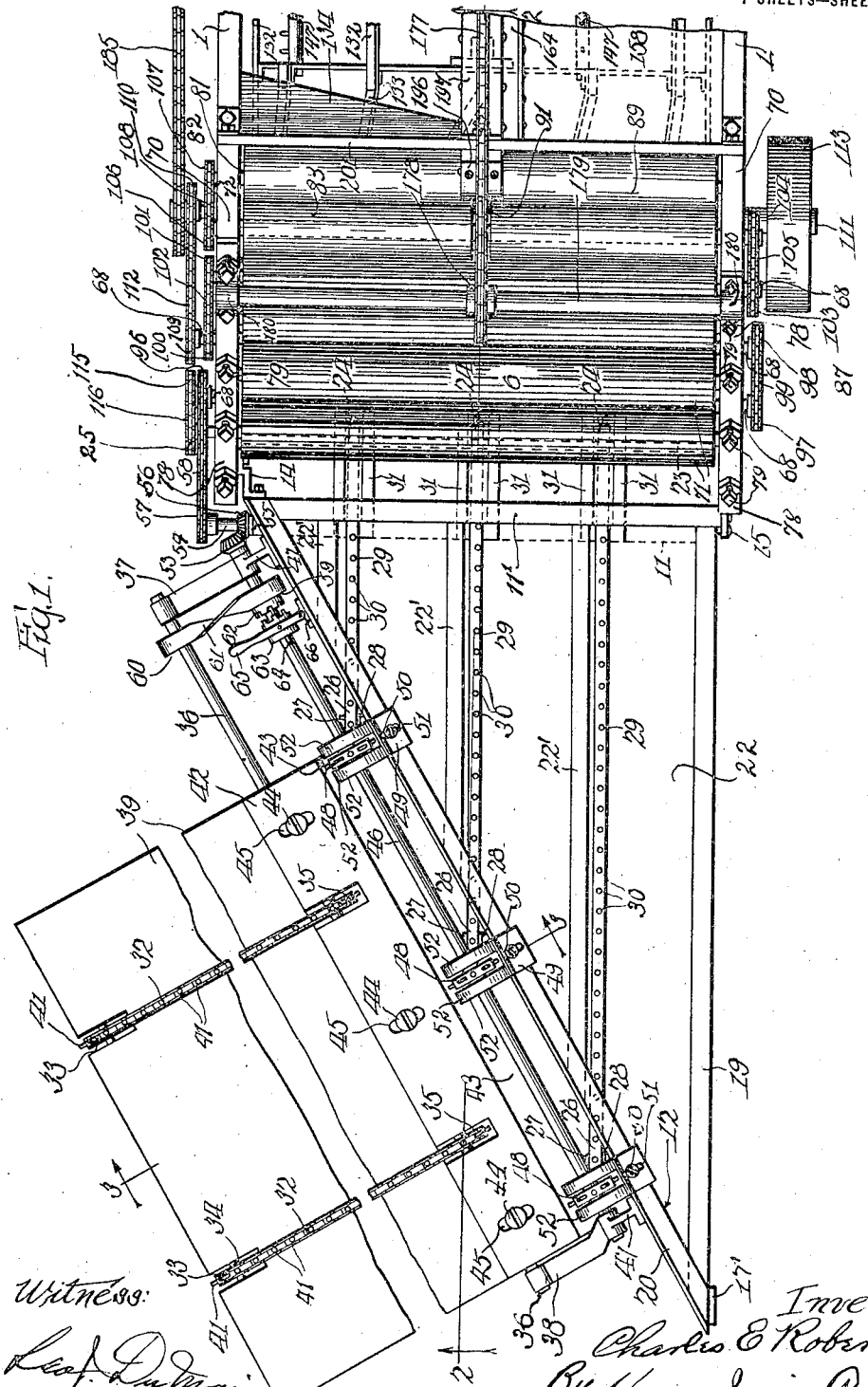
Figure 1 is a plan view of a machine constructed in accordance with my invention, with the rear portion of the machine broken away—the rear portion of the forward main rotary beater, and the rear main rotary beater, and parts of the rear feeding mechanism being omitted.

Fig. 3 is a detail view in vertical section, taken on line 3 of Fig. 1, looking in the direction of the arrow, and showing the initial feeding mechanism and platform or feed table for feeding fibrous material in oblique relation to and into position to be engaged by the main feed-chain mechanism, and also showing the means for regulating the supply of material fed to the main feed-chain mechanism and main feed table;

Fig. 4 is a view in central, vertical longitudinal section showing the portion of the machine which is located rearward with respect to the feeding mechanism shown in Fig. 2, for feeding material to the transverse fiber-treating rolls, and more particularly, showing the transverse fiber-treating rolls shown in Figs. 2 and 3, and the oppositely rotating rotary beaters located rearward with respect to the transverse rolls, and the feeding mechanism, for feeding material from the transverse rolls to the oppositely rotating rotary beaters having their axes at an angle to the axes of said transverse rolls. This view also shows the inclined fiber-supporting shield arranged over the forward portion of the forward one of the oppositely rotating beaters in position to deliver fiber to the latter in such a manner as to prevent the fiber from becoming twisted.

Fig. 5 is a view in transverse vertical section, taken on line 5 of Fig. 4, looking forward, as indicated by the arrow, showing the rear rotary beater in transverse section, and showing the fiber-supporting shields located over the upwardly moving sides of the oppositely rotating rotary beaters, and the inclined fiber-supporting shield located adjacent to the rear transverse rolls and over the downwardly moving side of the forward one of the main oppositely rotating beaters shown in Fig. 4.

Fig. 6 is an enlarged detail view in vertical section, taken on line 6 of Fig. 1, looking in the direction of the arrow, and showing the spring-pressed feed-chain mechanism, track and chain-guard for feeding material operated upon by the oppositely rotating beaters, and for delivering the treated fibrous material at the rear of the machine.

Fig. 7 is an enlarged detail sectional view taken on line 7 of Fig. 9, looking in the direction of the arrow, and showing the lower lap of the feed-chain and the spring and guard mechanism for holding the feed-chain and fibrous material in position with respect to the track and fiber-treating mechanism or beaters.

Fig. 8 is an enlarged detail view of the lower rear transverse roll showing the fiber-guiding arm with its forward portion extending over and in engagement with the peripheral portion of said roll at its longitudinal center, in position to support and guide fibrous material passing from the transverse rolls to the forward one of the rear oppositely rotating beaters.

Fig. 9 is a plan view showing the entire rear part of the machine, including the stripping means at the extreme rear end;

Fig. 10 is a view in side elevation partly in section of the rear upper feeding mechanism and stripper mechanism shown in Fig. 9;

Fig. 11 is a plan view of another form of feeding apparatus; Fig. 12 is an enlarged sectional view taken on line 12 of Fig. 11; and Fig. 13 is an enlarged sectional view taken on line 13 of Fig. 11.

In constructing an improved machine for breaking and scutching fibrous material in accordance with my invention, I provide a main frame comprising longitudinal side frame members 1, 1, transverse frame members 2, 3, 4 and 5, each connected at its opposite ends with said longitudinal frame members 1, 1, and upright frame members 6, 7 and 8, preferably in the form of bows having their opposite ends connected with and supported by the main longitudinal side-frame members 1, 1. (See Figs. 2, 4 and 5.)

The main frame may be of any suitable, ordinary and well known form, however, and is adapted to be mounted upon any suitable form of support, such, for instance, as legs 9 and transverse bottom frame members 10, which may form bolsters of a supporting running gear, in case the machine is to be supplied with running gears, or may form a stationary supporting base, in case the machine is to be stationary.

A main feed table or feed-chain-supporting frame 22 adapted to support the main toothed feed chains and fibrous material carried thereby into position to pass between and to be engaged and operated upon by the transverse rolls 67, 71 hereinafter described, is provided at the forward end of the main frame. This main feed table, when constructed as shown in Figs. 1 and 2 comprises in its construction a rear transverse frame member 11, an oblique lower frame member 12, and a longitudinal side frame member 19 connected at its forward end with the forward extremity of the diagonal or oblique frame member 12, and at its rear end, with the rear transverse frame member 11—the rear end of the oblique frame member 12 being connected with the opposite end of the transverse frame member 11 on the opposite side of the machine from that on which the longitudinal side frame member 19 is located. The triangular frame thus provided is, by preference covered by a platform forming the feed table 22, over which the feed chains 29 hereinafter described, are adapted to pass, carrying the fibrous material arranged thereon and in diagonal relation thereto, on their top rearwardly traveling laps, over said table from its front diagonal edge to its rear delivery edge. The oblique frame member 12 is supported by legs 16 and 17; and a diagonal frame member 13 is mounted forward of and in parallel relation to the frame member 12, and supported by legs 18 or other suitable ordinary supporting means. The forward end of the main feed table is supported by means of a leg 17'; its rear end being connected with the main frame and supported by means of bracket arms 14 and 15 on opposite sides of the main frame and connecting the rear extremity of the feed table with the main frame.

A triangular deck or upper frame is mounted over the main feed table 22 and spaced apart from the latter to permit the upper laps of the feed chains and fibrous material thereon to pass rearward between the upper frame and main feed table 22. The triangular upper frame shown, comprises a diagonal frame member 20 mounted over and parallel with the lower diagonal frame member or table-edge-supporting member 12. The forward end of the upper diagonal frame member 20 is supported by the leg 17', its rear end being supported by the bracket 14, or other suitable support, and, by preference, connected with the corresponding end of a transverse rear upper frame member 11' which is mounted over and parallel with the lower rear transverse frame member 11, and supported above the path of movement of the upper laps of the toothed feed chains 29 by brackets 14 and 15 or other suitable ordinary supporting means. The diagonal upper frame member 20 is spaced apart from the feed table 22 a sufficient distance to permit the top laps of the feed chains and a suitable quantity of stalks or fibrous material laid diagonally on the feed chains to pass rearward between the top frame and the feed table; and a series of longitudinal slats 22' each supported at one end by the top diagonal member 20 and its other end by the transverse frame member 11' in parallel relation to and above the level of the feed chains, serves to keep the fibrous material in position upon the top laps of the feed chains when in operation.

A transverse shaft 23 is journaled in suitable bearings in the main frame and in parallel relation to the rear delivery edge of the triangular feed table, and therefore, in oblique relation to the diagonal forward edge of the feed table and triangular top frame. Sprocket wheels 24 are fixed to said shaft at suitable intervals, for carrying the feed chains, and a driving sprocket 25 fixed to the shaft 23 is connected with a suitable driven member of the machine. Similar sprocket wheels 26 are rotatively mounted upon stub shafts 27 secured to the oblique marginal frame member 12 at suitable intervals, by means of supporting brackets 28, or other suitable supports, each sprocket 26 being in alinement with a corresponding sprocket 24, and adapted to form a support for the forward extremity of a toothed feed chain 29 the rear extremity of which is mounted upon and driven by such corresponding sprocket 24. The toothed main feed chains 29 are of unequal length, each being supported at its forward extremity upon a sprocket wheel 26 and at its rear extremity upon a corresponding sprocket wheel 24 in such a manner that the feed chains are in parallel relation to each other and extend rearward from and in oblique relation with respect to the forward oblique margin of the feed-chain-supporting frame or slatted triangular framework, the upper laps of said feed-chains being below the level of the upper oblique frame member 20 and in such position that the upwardly projecting teeth 30 project above the top surface of the slats 22 and pass rearward over the sprockets 26 and between the upper oblique frame member 20 and the lower oblique frame member 12 to the sprockets 24 on the driven shaft 23 at the rear extremity of the triangular feed-chain support. Curved stripper fingers 31 are mounted adjacent to the sides of the feed chains 29 at their rear extremity, in position to support and raise the fibrous material as it reaches the rear extremity of the feed-chains sufficiently to cause the fibrous material to become disengaged from the feed-chain teeth at the rear extremity of the chains and feed-chain supporting frame.

Initial feeding mechanism is provided, for feeding stalks of fibrous material, such as hemp or flax or similar material, in oblique relation to and into position to be engaged by the main feed-chain mechanism comprising toothed feed-chains 29 already described. This initial feeding mechanism, when constructed as shown in the drawings, comprises a plurality of toothed initial feed-chains 32 which extend in oblique relation to the main toothed feed-chains 29 already described, said initial feed chains being located forward with respect to the main feed chains and having their forward extremities mounted upon and supported by sprocket wheels 33 mounted upon a shaft 34 and having their rear extremities mounted upon and supported by corresponding sprocket wheels 35 fixed to a driving shaft 36 journaled in suitable bearings 37 and 38. The shafts 34 and 36 are parallel and in parallel relation to the oblique frame members 20 and 12 of the triangular feed-chain-supporting frame. An initial feeding platform or feed-table 39 is mounted upon suitable supports 40 in position to extend on opposite sides of and between the initial feed chains 32, so as to form a support for the centers and opposite extremities of stalks of fibrous material engaged by said initial feed chains. This platform is, by preference, slightly below the level of the top surface of the feed chains 32, and in position to support the top laps of said feed chains as they are caused to travel rearward at an oblique angle with respect to the main toothed feed-chains 29 already described, the upwardly projecting teeth 41 of the chains 32 being in position to project above the level of the top surface of the feeding platform 39. The rear margin of the initial feeding platform 39 is forward with respect to and in parallel relation to the oblique front receiving margin of the main triangular feed-chain-supporting frame. And the initial feed table and initial feed chains are thus in position to feed stalks of fibrous material to the main feed chains 29 in such a manner that the stalks extend in oblique relation to the main toothed feed chains 29 when said stalks are delivered onto or in position to be engaged and fed rearward by the latter. An adjustable guard plate or quantity-regulating member 42 having a curved rear portion 43 which projects rearward beyond and below the level of the rear oblique margin or delivery end of the initial feed table and initial toothed feed chains, is adjustably secured in operative position by means of headed bolts 44 which extend through elongated slots 45 in said guard plate and are anchored in the rear marginal portion of the initial feed table. A shaft 46 is rotatively mounted in suitable bearings 47 which may be in the form of bracket arms secured to the oblique angle-iron frame member 20 already described. This shaft is located intermediate the upper oblique frame member 20 and the rear margin of the initial feed table 39; and a series of peripherally toothed fiber-feeding wheels 48 are fixed to said shaft between the adjustable guard-plate 42 and the forward oblique margin of the triangular feed-chain-supporting frame and main toothed feed chains already described. Each toothed feed wheel 48 has a curved guard plate 49 which is adjustably mounted upon the upper oblique angle-iron member 20 by means of a headed bolt 50 anchored in the angle-iron member or support and extending through an elongated slot 51 in such guard plate. Each guard plate 49 comprises in its construction one or more curved guard arms 52 located adjacent to the edge of the corresponding toothed wheel 48 and partially encircling the shaft 46 upon which the said toothed wheels are mounted. These curved guard arms have their upper curved portions farther from the axial center of the shaft 46 and toothed wheels 48 than are their lower ends, the lower ends of the said curved guard arms being nearer to the axis of the shaft than are the outer extremities of the peripheral teeth 51′ on said toothed wheels. It will thus be readily seen that the peripheral teeth of the toothed wheels, as they move downward and rearward, project gradually farther and farther beyond the adjacent curved guard arm, the portions of the teeth which project beyond the adjacent guard arm being in position to engage and feed rearward the stalks of hemp or other fibrous material fed or delivered over the rear margin of the initial feed table by the initial toothed feed chains 32, in position to extend in oblique relation to the main toothed feed chains 29 and the direction of movement of the latter. (See Figs. 1 and 3.)

The rotary shaft 46 is operatively connected with a suitable driving mechanism or source of power by means of a bevel gear 53 fixed to the rear extremity of said shaft, a stub shaft 54 mounted in suitable bearings 55 in the frame, and a bevel gear wheel 56 fixed to said stub shaft and in toothed engagement with the bevel gear 53. The stub shaft 54 has a sprocket wheel 57 fixed to its outer extremity and operatively engaged by a driven sprocket chain 58, said chain being driven by mechanism hereinafter described.

The shaft 46 is operatively connected with the shaft 36 by means of a belt pulley 59 loosely mounted on the shaft 46, a pulley 60 fixed to the shaft 36 and a belt 61 mounted upon and forming a connection between said pulleys. A clutch member 62 is fixed to the pulley wheel 59, and a movable clutch member 63 is connected with the shaft 46 in the ordinary manner by means of a spline 64 so as to rotate with the shaft and be movable longitudinally of the shaft into and out of engagement with the clutch member 62 by means of a pivoted clutch-operating lever 65 which engages a peripherally grooved portion of the clutch member 63 and is pivotally connected with a suitable supporting bracket 66. (See Figs. 1 and 2.) Means is thus provided for stopping and starting the initial feeding mechanism when desired. And the initial toothed feed chains are thus operatively connected with the main feed chains and the mechanism for driving the latter, in such a manner that the initial feed chains are driven at the desired speed relatively to the speed of movement of the main feed chains; and the toothed feeding and quantity-regulating wheels 48 are operatively connected with the initial feed-chain mechanism and main feed-chain mechanism in such a manner that said wheels 48 and the initial and main toothed feed chain mechanism are all operated synchronously or at the desired uniform speed with respect to one another. The quantity of stalks fed from the initial to the main feed chains is thus automatically regulated.

The initial feed chains or conveyer chains 32 and the feed-table 39 may be of any desired length, and are adapted to carry material from a distance or through the interior of a suitably heated drying chamber through which said initial feeding chains are adapted to pass, and to the main feed mechanism. And material placed upon the initial feeding chains in layers of unequal or varying thickness or irregular quantities will be delivered to the main feed-chains in the form of a layer of stalks each extending transversely across the initial feed-chains and in oblique relation to the main feed chains, the thickness of such layer being comparatively uniform at the point where it comes into engagement with the main toothed feed chains, as the thickness of the layer of stalks is regulated and controlled by the rotary peripherally toothed quantity-regulating wheels 48 and the adjustable guard member 42 which is adapted to be adjusted and secured in any desired adjusted position with respect to said wheels 48, so as to provide a limited space of any desired dimensions for permitting the passage of stalks in suitably regulated quantities between the guard plate 42 and wheels 48, and from the initial to the main toothed feed-chains.

Mounted rearward with respect to the triangular feed-chain-supporting frame and the main toothed feed chains 29 and in position to receive stalks of fibrous material from the latter, is a series of transverse fluted or peripherally ribbed rolls or rotary fiber treating cylindrical members comprising a series of lower peripherally ribbed rolls 67 having their axles 68 journaled in suitable bearings 69 in inclined upright side frames 70, fixed to and forming parts of the corresponding side frames of the machine, and a series of corresponding upper peripherally ribbed rolls 71, rotatively mounted above and in parallel relation to said lower ribbed rolls, and having the axles 72 of said rolls 71 journaled in suitable sliding bearing blocks 73 which are slidably mounted between inclined upright guides 74, forming ways adapted to permit the movement of the sliding bearing blocks and of the upper rolls with respect to the adjacent lower rolls so as to enable fibrous material to pass between the upper and lower peripherally ribbed rolls in such a manner as to cause the shives or hurds to be broken into fragments and the fibrous material to pass between and to be flexed or bent and freed from the shives to as great an extent as possible without unnecessary breaking of or injury to the fibers. In order to enable these and other objects of the invention to be accomplished in a simple and efficient manner, the lower rolls 67 are each provided with a series of longitudinal peripheral ribs 75 having corresponding grooves or spaces between said ribs, and the upper rolls are each provided with corresponding longitudinal peripheral ribs 76 adapted to engage and extend between the longitudinal peripheral ribs of the corresponding adjacent lower ribbed rolls and to provide a sufficient space between the ribbed peripheries of the upper and lower rolls to permit stalks of fibrous material to pass between and to be operated upon by said rolls and delivered thereby at the rear of the set of rolls. Compressible springs 77 are interposed between the upper sides of the sliding bearing blocks 73 and a top retaining plate 78 at each side of the machine, respectively. And adjusting screws 79 are mounted in threaded engagement with the retaining plates 78 each of said screws being in engagement with a spring-engaging head or washer 80 interposed between the inner end of such screw and the corresponding spring 77, there being an adjusting screw for each spring 77 and sliding block 73, and a spring 77 and sliding block 73 in operative engagement with each end of each axle 72.

Mounted directly back of the rear pair of peripherally ribbed rolls 67, 71, is a pair of feed rolls consisting of a lower roll 81 having its axle 82 journaled at its opposite ends in suitable bearings in the corresponding inclined side frames 70 already described, and an upper rear feed roll 83 rotatively mounted in parallel relation to said roll 81 and in position to engage fibrous material passing between the upper surface of the roll 81 and the bottom surface of said roll 83, from between the rear pair of peripherally ribbed rolls. The upper rear feed roll 83 is directly back of the rear upper ribbed roll 71 and is provided with an axle 84 having its opposite ends journaled in suitable bearing blocks 85 at the opposite ends of said roll, said bearing blocks being of identical construction with the bearing blocks 73 already described, and being slidably mounted in the side frames 70 and pressed downward by means of compressible springs 86 interposed between said blocks and the corresponding top retaining plates 78 at the opposite ends of said rolls. Each spring 86 has a tension screw 87 in threaded engagement with the adjacent retaining plate 78 and having its inner end in engagement with a head or washer 88 interposed between the retaining plate 78 and such spring, for regulating the tension of the springs 86. The bottom roll 81 comprises in its construction a main body portion formed in two cylindrical sections or parts 89, 89 in concentric relation to the axle 82, and provided with a peripheral annular groove 90 at the longitudinal center of the roll into which extends an annular or curved forward end portion of a guiding arm or bracket 91 which extends over the axial center of the grooved central portion of the roll 81 and, by preference, encircles the central portion 92 of the roll, the opposite or rear extremity of said guiding arm 91 being secured to the machine frame by means of a securing plate 93 and bolts 94 and 95, the bolt 94 serving to secure the plate to the part 91, and the bolt 95 being anchored in an upright frame member 96 and secured to said plate 93. (See Figs. 2 and 6.)

The top rear feed roll 83 is also provided with a circumferential groove at its longitudinal center and in alinement with the groove 90 of the lower roll, for permitting a feed-chain hereinafter described to pass freely through the grooved portions of said rolls and over the fiber-guiding arm 91 above described.

Suitable driving mechanism is provided for operating the transverse rolls and the feeding mechanism above described, and, when constructed as shown in the drawings, comprises a train of gears or chain and sprocket mechanism constructed and arranged as follows: A sprocket wheel 96 is fixed to the forward lower shaft 68 and operatively connected with the sprocket wheel 57 on the stub shaft 54 already described, by means of the sprocket chain 58 already described, for driving the feed-chain mechanism located forward and in oblique relation to the main feed-chain mechanism and operatively connected with shafts 36 and 46 already described. The axle 68 upon which the sprocket wheel 96 is mounted, is operatively connected with the next adjacent axle 68 to the rear by means of a sprocket wheel 97 fixed to the first-mentioned axle and a sprocket wheel 98 fixed to the second mentioned axle, and a sprocket chain 99 mounted upon and connecting said sprocket wheels. A sprocket wheel 100 is fixed to the opposite end of the shaft or axle upon which sprocket wheel 98 is mounted, and is operatively connected with a sprocket wheel 101 on the next lower axle 68 of the series, by means of a sprocket chain 102 mounted upon and connecting said sprocket wheels 100 and 101. A sprocket wheel 103 fixed to the shaft or axle 68 upon which the sprocket wheel 101 is mounted is connected with a sprocket wheel 104 fixed to the next axle 68 to the rear, by means of a sprocket chain 105 mounted on said sprocket wheels 103 and 104. A sprocket wheel 106 fixed to the axle 68 upon which sprocket wheel 104 is mounted is operatively connected with a sprocket-wheel 107 fixed to the corresponding end of the axle 82 of the lower rear feed roll 81, by means of a sprocket chain 108 mounted upon said sprocket wheels 106 and 107.

From the foregoing it will be seen that the axles 68 of the lower rolls 67 and the axle 82 of the lower rear feed roll 81 are all connected so as to rotate in the same direction; and to cause the upper rolls to rotate in an opposite direction so as to cause the stalks of fibrous material to pass rearward between said upper and lower rolls. It is also plain that by connecting any desired one of the lower axles 68 with a driving shaft or source of power, the entire set of rolls will be driven as above indicated. In order to enable this to be accomplished, a sprocket wheel 109 is fixed to an axle of one of the lower ribbed rolls, in this instance, the axle upon which the sprocket wheel 100 already described is mounted. (See Fig. 1.) And a sprocket-wheel 110 is fixed to a drive shaft 111 which has its opposite ends journaled in suitable bearings in the main frame and is adapted to be connected with a suitable source of power. A sprocket chain 112 is mounted upon and connects said sprocket wheels 109 and 110. The main drive shaft 111 is provided with a main drive wheel which may be in the form of a belt pulley 113 adapted to be connected with a motor or engine which may be of any desired suitable form.

In order to provide means for driving the shaft 23 and the main feed-chain mechanism consisting of feed chains 29 already described, a sprocket-wheel 25, is fixed to the shaft 23, and a sprocket wheel 115 is fixed to a suitable driven shaft which in this instance is the shaft or axle 68 upon which sprocket wheel 96, already described is mounted. A sprocket chain 116 is mounted upon and connects said wheels 25 and 115.

An auxiliary drive shaft 117 journaled in a bearing 118, is operatively connected with the main drive shaft 111, by means of a toothed gear 119 fixed to said auxiliary shaft and in toothed engagement with a toothed gear 120' fixed to said drive shaft 111, for driving the rear upper feed chains hereinafter described.

Mounted rearward with respect to the transverse rolls above described is a pair of rotary beaters or beating and scutching cylinders consisting of a forward rotary beater or cylinder 120 and a rear rotary beater or beating and scutching cylinder 121, are ranged in end to end relation, and by preference, having their axes in alinement.

The rotary beater 120 comprises in its construction an axle 122 which is rotatively mounted at its forward extremity, in a suitable journal bearing 123 fixed to a suitable support which may consist of the transverse frame member 3 already described, the rear extremity of said axle being journaled in a bearing 124 mounted upon a suitable support which may be in the form of a bracket 125 fixed to the central portion of the transverse frame member 4 already described. Fixed to the forward portion of the axle 122 is a hub 126 having a series of radial spokes or arms 127 the inner ends of which are fixed to said hub, and the outer extremities of which are bent to form angular end portions 128. A rear hub 129 is fixed to said axle or near its rear end, and is provided with a series of similar radial spokes or arms 130, the inner ends of which are fixed to said hub, and the outer ends of which are bent so as to form angular end portions 131. Fixed to the outer flanged ends of the spokes 127 and 130 is a series of longitudinal beater blades or peripheral ribs 132. Each of these peripheral ribs or beater blades has an angular forward end portion 133 which extends forward and circumferentially of the beater at an oblique angle with respect to the rear or main body of the rib in the direction of rotation of the beater. The forward oblique angular portion of each rib or beater blade is thus in advance of the main body of the rib with respect to the direction of rotation of the beater. These forward oblique angular portions of the ribs are each secured in fixed relation to and in position to extend forward with respect to a corresponding spoke 127 at the forward end of the beater; and the rear end of each of the ribs 132 is fixed to the flanged outer end of a corresponding spoke 130 at the rear end of the beater. Mounted in position to extend downward from the peripheral surface of the feed roll 81 and rearward at an incline over and in oblique relation to the forward oblique angular end portions 133 of the ribs 132 on the downwardly moving side of the beater 120, and having its rear margin or edge curved and arranged in position to extend outward and downward and rearward over and at an oblique angle with respect to the forward oblique angular end portions 133 of the ribs or beater blades 132 from a point approximately over the axis of the beater at the forward end thereof to the outer side of the beater is a fiber-supporting shield or guard plate 134. (See Figs. 1, 2, 4 and 5.) This shield or guard plate has its horizontal upper margin or edge arranged in position to engage the upper or rear downwardly moving peripheral surface of the rear lower feed roll 81 on the downwardly moving side of the rotary beater, at the forward end of the latter, and is secured to the machine frame by means of a connecting arm 135 at or near its lower extremity, and by means of securing screws connecting the upper part of the plate with the machine frame and in position to engage the periphery of said roll, or by other suitable securing means. This shield or guard plate is thus adapted to support the fibrous material discharged from between or passing from between the transverse rolls above described, over the downwardly moving side of the beater in such a manner that the oblique forward angular portions of the beater ribs or blades 132 will come into contact with the portions of the fibers located at or near the top of the beater before coming into contact with the outer end portions of the fibers or fibrous material, and the outer end portions of the fibers will be supported by the shield and permitted to pass over the same in such a manner as to be prevented from coming into contact with the beater blades 132 until after the upper central parts of the fibers or fibrous material have been struck and pulled outward and rearward and downward by the oblique angular end portions 133 of the beater ribs or blades which are thus caused to come into contact with the fibers progressively from the longitudinal central parts of the stalks or fibers toward their outer ends. The twisting of the fibers as they pass rearward over the forward part of the beater 120, which would occur in the absence of the shield 134, is thus prevented, and the fibers are straightened to a considerable extent and properly started in their movement rearward over the beater before they are released from engagement with the transverse rolls. The shield serves to keep the fibers in advance of the parts of the stalks engaged by the feeding mechanism as they pass rearward over the beater from becoming twisted by coming into contact with the beater in advance of the said engaged parts of the stalks or fibers. As soon as the parts of the stalks or fibers engaged by the feeding mechanism are even with or not lagging behind the parts of the fibers engaged by the beater the fibrous material will be scutched and fed rearward over the downwardly moving side of the beater without becoming twisted. The importance of preventing the twisting or wrapping of the fibrous material will be readily apparent to those skilled in the art.

The rear rotary beater 121 is by preference, of substantially the same diameter as the beater 120, and comprises in its construction a forward hub 136 and a rear hub 137 both fixed to an axle 138, the opposite ends of said axle being journaled in suitable bearings 139 and 140 supported on the main frame. The forward journal bearing is, by preference mounted upon a supporting bracket 141 secured to the transverse frame member 4 at a point directly back of and in position to support said bearing in alinement with the bearings 124. The bearings 123, 124, 140 and 141 are thus supported in alinement and in position to rotatively support the axles 122 and 138 in alinement with each other. A series of radial spokes or arms 142 are fixed to the forward hub 136, the outer end of each of said spokes being bent to form an angular end portion 143. A similar set of spokes or arms 144 are secured at their inner ends to the rear hub 137, the outer ends of said spokes being provided with bent angular end portions 145. A series of longitudinal peripheral ribs, beater blades, or beater bars 146 forms the outer periphery of the rear rotary beater 121. Each of these peripheral beater bars or ribs 146 is secured in fixed relation to the flanged end of a spoke or radial arm 142 at or near the forward extremity of such rib, the rear extremity of each rib being fixed to a corresponding radial spoke or arm 144 at or near the rear extremity of the rotary beater. The ribs 146 and 142 of the beaters are secured to the flanged end portions of the spokes which support them, by means of rivets, or other suitable securing means, so that each rotary beater forms a strong structure capable of withstanding the stresses and strains to which it is subjected in use.

In order to provide means for combing the fibrous material as it passes rearward in position to be operated upon by the rotary beaters 120 and 121, each of said beaters is, by preference, provided with a plurality of adjustable combs 147 which may be cylindrical in form and made of wood or metal; and each comb member 147 has a series of radially projecting teeth 148 projecting outward from its main body portion toward the periphery of the beater on which such comb is mounted. Each comb 147 of the forward rotary beater 120 has its forward end secured to the outer portion of a spoke 127 by means of a headed securing screw 148 which extends through a perforation in the spoke and into the end of the comb member 147 which abuts against the inner side of the spoke; and the opposite end of such comb member is secured in the same manner to a spoke 130, by means of a screw 149. Each comb member 147 of the rear rotary beater is secured in operative position between and in adjustable position with respect to spokes 142 and 144 at the opposite ends of said beater, respectively, by means of headed securing screws 150 and 151 in the same manner in which the combs of the forward rotary beater 120 are mounted. It is obvious that the combs 147 are thus adapted to be turned part way around upon their axes to any desired adjusted position so as to support the teeth 148 in position to extend at any desired angle and in position to engage and comb and clean the fibrous material as it passes rearward from end to end of the rotary beaters.

In order to provide means for rotating the rotary beaters 120 and 121 in opposite directions simultaneously, and in such a manner that the side of the beater 120 over which the inclined shield 134 extends will move downward, while the same side of the rear beater will move upward, a bevel gear wheel 152 is fixed to the forward end of the axle 138 of the rear beater; a similar bevel gear wheel 153 is fixed to the rear end of the axle 122 of the forward rotary beater 120, and a bevel pinion 154 is fixed to a stub shaft 155 journaled in a suitable bearing in the machine frame, by preference in the part 4 already described, said pinion being in toothed engagement with both of said bevel gear wheels between which the pinion is located. A similar bevel gear wheel 156 is fixed to the forward end of the axle 122 of the beater 120 and in toothed engagement with a bevel pinion 157 fixed to the main drive shaft 111 already described. (See Fig. 4.)

Oblique stub beater bars 160 of identical construction with the forward end portions 133 of the beater bars 132, are secured to the outer flanged ends of the spokes at the forward ends of the combs 147 of the forward rotary beater 120; and straight stub beater bars 161 may be mounted upon the flanged ends of the spokes of the rear rotary beater 146 to which the forward ends of the combs 147 of the rear beater are secured.

An upright inner frame member 162, which may be in the form of a bow having its split bottom ends 163 secured to the transverse frame member 4 already described, is mounted between the adjacent ends of the forward rotary beater 120 and the rear rotary beater 121, and a rear upright frame member 164' is mounted at the rear end of the rear rotary beater, where it is secured to the rear transverse frame member 5 already described. A track 164 is mounted in position to extend longitudinally of and over the longitudinal central portion of the forward rotary beater 120, and has its forward end connected with the rearwardly extending end portion 165 of the fiber-guiding arm 91 which extends rearward from between the rear feeding rolls 81 and 83. The track 164 is in line with and forms an extension of the fiber-guiding member 91, and has its rear end secured to the supporting frame member 162 by means of an upright frame arm 166. (See Fig. 5.) A curved shield 167 is secured at its upper edge to the track 164 and extends downward therefrom over the upwardly moving side of the rotary beater 120 from end to end of the latter and from end to end of the track, and has its lower edge secured to the corresponding side-frame member 1 by means of securing screws 168 anchored in said frame member 1 and extending through the bottom flanged portion of said shield. The fibrous material passing over the upwardly moving side of the rotary beater 120 is thus prevented from coming into contact with said beater. A similar track 169 has its forward end supported by the frame member 162 between the rotary beaters 120 and 121, by means of an upright frame arm 170 which connects the forward end of said track with the said upright bow-shaped frame member 162, the rear end of said track being secured to and supported in position by the rear upright frame member 164' already described. (See Figs. 4 and 5.) This track 169 extends longitudinally of and over the upwardly moving side of the rear rotary beater 121 in parallel relation to the axis of the latter, and at one side of the longitudinal center of the beater a sufficient distance to engage the fibrous material passing from the downwardly moving side of the forward rotary beater 120 onto said track, to be fed along the latter from end to end of the rear rotary beater. The forward end of this track 169 is depressed or bent downward somewhat so as to extend beneath the rear ends of the longitudinal beater bars or ribs of the forward rotary beater 120 as they reach their upward limit of movement. This depressed inclined forward end portion 171 thus permits the rear end portions of the ribs of the beater 120 to pass over it, and is in position to permit the fibrous material passing from the rotary beater 120 to pass onto and be guided by said depressed forward portion of the track 169 onto said track, and into position to be fed along longitudinally along the track, from end to end thereof and from end to end of the rear rotary beater 121. A curved shield 172 has its upper edge secured to the track 169 and extends outward from the track over the upwardly moving side of the rear rotary beater from end to end thereof, the lower edge of said shield being secured in position upon the corresponding side frame member 1 by means of securing screws or bolts 173, which extend through the lower flanged marginal portion of said shield. (See Fig. 5.)

The forward margin of the curved shield 172 extends forward beyond the rear ends of the beater bars or ribs 132 and between said rear ends of said beater bars and the axial center of the rotary beater 120, and is overlapped by the rear ends of said beater bars which are located in position to pass outward and downward around the outside of the forward margin 174 of said shield, so that fibrous material passing from the rear ends of said beater bars 132 will be delivered onto the outside of said shield. The rear margin 175 of the curved shield 167 projects rearward over and beyond the forward end portions 176 of the rear beater bars 146 and the forward end portions of stub beater bars 161, on the outside of the same, so as to overlap said forward end portions of said beater bars 146 and stub beater bars 161 and deliver fibrous material passing over said shield onto the outside of said beater bars and stub beater bars in position to be engaged and scutched and cleaned by the latter as they move outward and downward.

An endless toothed feed-chain 177 is mounted above the longitudinal central portion of the rotary beater 120 and over the track 164 already described. The forward extremity of this feed chain is supported upon and in operative engagement with the toothed periphery of a sprocket wheel 178 fixed to an idler shaft 179 which is journaled in suitable bearings 180 on the frame 70. The rear extremity of said feed chain is supported upon and in operative engagement with the toothed periphery of a sprocket wheel 181 fixed to a transverse shaft 182, the opposite ends of which are journaled in bearings 183, 183 mounted upon longitudinal top frame members 184, 184, which are secured to and supported by the upright bow-shaped frame members 6, 7, and 8 already described. The shaft 182 is operatively connected with the main driving shaft 111, already described, by means of a sprocket wheel 183' fixed to the shaft 182, a sprocket wheel 184' fixed to the shaft 117, and a chain 185 mounted upon and connecting said sprocket wheels.

A similar toothed feed chain 186 is mounted in position to extend from a point forward and to one side of the rear extremity of the feed chain 177 and track 164 rearward over the upper portion of the rear rotary beater 121 to and rearwardly beyond the rear end of said beater, and over the track 169 already described. This feed chain has its forward extremity supported upon the toothed periphery of a sprocket wheel 187 fixed to a transverse shaft 188, the opposite ends of said shaft being journaled in bearings 189, 189 mounted upon the longitudinal top frame members 184, 184 already described. The rear extremity of the feed chain 186 is supported upon the toothed periphery of a sprocket wheel 190 which is fixed to a rear transverse shaft 191, the opposite extremities of said shaft being journaled in bearings 192, 192 supported by the longitudinal top frame members 184, 184 above described.

The feed chain 186 is driven by means of a sprocket wheel 193 fixed to the shaft 191, a sprocket wheel 194 fixed to the shaft 182 and a sprocket chain 195 mounted upon the toothed peripheries of said sprocket wheels and forming a connection therebetween.

In order to provide means for holding the lower laps of the toothed feed chains 177 and 186 in operative position with respect to their respective tracks 164 and 169, so that the lower lap of each of said chains will be yieldingly held in engagement with the fibrous material extending transversely between the feed chain and its track in such a manner as to hold the fibrous material against being drawn transversely with respect to the feed chain and track during the feeding of the material along the tracks over and in a direction lengthwise of the rotary beaters 120 and 121, each of said feed chains is provided with a flexible element in the form of a strap 196 which extends longitudinally of and in engagement with the top surface of the lower rearwardly moving lap of such chain. A hollow frame comprising a top frame member or bar 197 having depending side walls of frame members 198, 198 fixed thereto and provided with longitudinal inwardly extending flanges 199, 199 on opposite sides of the longitudinal bottom opening in said frame and fixed to the bottom margins of said side wall members 198, is mounted over each strap 196 and the lower lap of each of said feed chains, in position to cover the strap which extends between the flanges 199, 199, and so as to guide and permit the movement of the lower lap of each chain—177 and 186—between said side flanges and in such position that the toothed depending side members of the feed chain links will straddle and pass along longitudinally of the upright longitudinal fiber-engaging track member 200 located between said toothed side members of the feed chain links. Each strap 196 has its forward end connected with a suitable support which, in this instance, is the forward end of the corresponding bar 197, the rear end of the strap being connected with and supported by the rear end of such bar. The top frame member or bar 197 for the forward feed chain 177 is supported at its forward extremity by means of a transverse frame member 201 to which it is secured by means of an angle iron 202 and bolts 203 and 204, or other suitable securing means; and the rear end of said top frame member or bar 197 is supported by means of the bow-shaped frame member 6, to which it is secured by means of screws or other ordinary securing means.

The forward end of the top frame member or bar 197 which supports the strap 196 over the lower lap of the rear feed chain 186 and forms the top of the hollow frame which covers and extends in parallel relation to the lower lap of said chain, is supported by the bow-shaped frame member 7 already described, and its rear end is supported by the rear bow-shaped frame member 8, the hollow frame of which said bar 197 forms a part, being secured to said bow-shaped frame members by means of securing screws, or any ordinary suitable securing means.

Mounted in engagement with the top surface of each strap 196 and between the corresponding flanges 199 of the box or hollow frame covering such strap is a series of metallic plates 205 arranged in end to end relation to each other throughout the entire length of the chain-engaging portion of such strap, the adjacent ends of said plates being in abutting relation to each other, and each of said plates having its opposite edges 206 projecting laterally beyond the corresponding longitudinal edge of the strap and in position to engage and be supported by the top surface of the corresponding inwardly extending flange 199. Interposed between the top face of each plate 205 and the top frame member or bar 197 is a compressible spring 207 which is under tension so that it tends to press the corresponding plate 205 downward against the flanges 199, which limit the downward movement of the plates, and against the top face of the strap 196. The extent of downward movement of these spring-pressed plates being thus limited, it is plain that the lower lap of the feed-chain passing between the spring-pressed plates and the track is free to move longitudinally of the track and is not actually pressed against the track by the action of the springs and spring-pressed plates, but that the lower lap of the feed chain is yieldingly held in engagement with any fibrous material fed into position to extend transversely across the track and between the track and feed chain, in such a manner that the feed chain will engage and prevent the fibrous material from being drawn transversely of the track or in a direction longitudinally of the stalks or fibers, although the layer of fibrous material may be of more or less uneven or varying thickness, or the stalks of unequal and varying thickness.

The tracks are each provided with a groove 208 which is adapted to admit and permit the movement of the depending side link members of the feed chain longitudinally of the track and in engagement with fibrous material extending into and transversely across said groove and engaged by the toothed portions of the links which extend into the groove. The fibrous material is thus flexed or bent between the chain and track and prevented from being pulled out transversely from between the chain and track.

In order to provide means for stripping the fibrous material from engagement with the rear feed chain 186 at the rear end of the rear rotary beater and the track 169, a flexible element which may consist of an endless canvas belt 209 is mounted upon the rear feed chain 186 and in position to extend in parallel relation to the latter and beneath and in engagement with the lower side of the bottom lap of said feed chain and between the toothed side link members of said chain,—the lower lap of said stripper belt 209 being between the bottom of the lower lap of the feed chain and the track and in parallel relation and in engagement with the said bottom lap of the feed chain.

The stripper belt 209 is longer than the feed chain in connection with which it is used, and extends rearward beyond the rear extremity of said feed chain, and downward from the latter and rearward endwise beyond the rear end of the track, and the rear extremity of the stripper belt is supported upon an idler pulley 210 which is rotatively supported in position rearwardly beyond the rear extremity of the feed chain and rear end of the track by means of bracket arms 211 on the main frame, and a stub shaft 212 which forms the axis of the pulley and is supported by said bracket arms or frame members 211.

A fiber carrying arm 213 is pivotally mounted upon a suitable support which may be in the form of a rearwardly projecting end portion of the rear track 169, by means of a pivot pin 214. The outer end of the arm may be left free to permit the swinging of the arm to any desired position. The inner end of the arm 213 is thus in position to receive the fibrous material passing from the track and stripped from engagement with the rear feed chain 186, by the stripper tape or belt 209, the lower lap of which extends downward at an angle and rearward beyond the rear end of the track and beyond the rear extremity of the lower lap of said feed chain, and from between the teeth of the feed chain as shown in Fig. 10. The arm 213 is pivoted, for convenience, but it forms an extension of the track which is adapted to extend beneath and support the fibrous material as it leaves the rear feed chain, and would serve this purpose very successfully if rigidly connected with the track.

The machine, constructed as above described is adapted to feed and deposit fibrous material or stalks laid upon the initial feed chains, in position to extend obliquely with respect to the main feed chains, which feed the stalks between and in oblique relation to the axes of the transverse longitudinally ribbed crusher rolls, and the fibrous material, extending in oblique relation to the ribbed and smooth faced transverse rolls is thus carried to and fed rearward by the rear upper feed chains in a direction longitudinally of the rear rotary beaters, with the aid of the angular shield plate 134, so that the fibers are cleaned from their central portions to one end by the downwardly moving side of the rotary beater 120, and from their centers to their opposite ends by the downwardly moving side of the rear rotary beater, and supported in position to be out of contact with the upwardly moving sides of both of said rotary beaters during the operation.

The fibers are stripped from engagement with the rear toothed feed chain by the stripper belt 209 in an efficient manner, and deposited upon the fiber-supporting arm 213, at the rear of the machine.

The fibrous material is thus broken and scutched and cleaned by one continuous uninterrupted operation and in an efficient manner, and the machine is strong, durable and compact, simple in construction and operation, and capable of handling large quantities of material in an economical and efficient manner.

Another form of mechanism for feeding and regulating the quantity of fibrous material to be fed in oblique relation to and into position to pass between and be engaged and operated by the peripheries of the transverse rolls 67 and 71 above described, is shown in Figs. 11, 12 and 13, in which a main lower feed-chain supporting frame or lower feed-table 214 of approximately triangular form is employed in lieu of the feed table 22 already described. This main lower feed-table has a front oblique fiber-supporting marginal portion 215 which extends rearwardly and laterally at an oblique angle from a point at or near the forward extremity of one side margin of said main lower feed chain support or main lower feed table 214, to a point at or near the opposite side and rear extremity of said feed table, and adjacent to and in front of the front transverse feed rolls.

The rear extremity of this lower or main feed table 214 is supported by means of a transverse frame member 216, and the brackets 14 and 15 located on opposite sides of the main frame, as already described. These frame members or brackets 14 and 15 are adapted to form suitable supports for the rear portion or delivery end of the main lower feed table as a whole, or for both the lower or feed-chain supporting frame or feed table 214 and an upper triangular feeding platform or feed table 217.

This preferably approximately triangular upper feed-table member or platform 217 is mounted above the level of and spaced apart from the lower feed-chain supporting frame or main lower feed table 214, and, by preference in position to extend over and across the latter, and is adapted to support hemp or fibrous material in position to be fed with facility over the oblique or diagonal forward edge 218 and into and in oblique position with respect to the feed-chains 29 already described.

The upper triangular feed table member or platform 217 may be extended laterally beyond the side margin of the lower main feed table—as shown by the laterally projecting upper feed-table or platform portion 219, in Fig. 11—to any desired extent, and is supported and suitably spaced apart from and above the level of the main lower feed table or feed-chain-supporting frame 214 by means of a diagonal or oblique frame-member 220 which may be in the form of a flat strip of wood or other suitable material having its forward extremity located on one side of the feed-table, deck or top platform, and supported by suitable means, such, for instance as an upright frame member or leg 221, the rear extremity of said frame member 220 being located and supported in position above the level of the lower main feed-table on the opposite side of the machine, by means of a suitable support, such as the bracket 14 already described, having a bracket member 222 attached to said bracket member 14, and a rear transverse upper frame member or top platform member 223' laid upon said bracket member or block 222 and secured thereto on one side of the machine, and having its opposite end connected with and supported by the bracket 15 already described. The frame member 220 thus extends across the bottom side of the top platform member diagonally in parallel relation to the diagonal edge 218 of said platform, already described.

The upper feeding platform, is thus supported in position to extend over and cover the lower feed table 214, and is spaced apart from the latter, so as to leave a suitable space for permitting the toothed feed chains 29 to extend between the upper and lower feed table members 214 and 217, with the top fiber-carrying laps of said feed chains in position to rest upon and travel in parallel relation to each other longitudinally of the feed table, from a point beneath or forward a short distance beyond the diagonal fiber-engaging edge 218 of the top platform to the rear discharge end of the feed table, where the rear extremities of said feed chains are in position to deliver fibrous material laid upon or in position to be engaged and fed rearward by said chains, and in oblique relation to their path of movement as well as in oblique relation to the axes of the rolls 67 and 71 already described, so as to enable the fibrous material to pass through the series of transverse rolls while the fibers or stalks are in oblique relation to the axes of said rolls. Stripper fingers 223, corresponding with stripping fingers 31 already described, are mounted beside the rear extremities of the chains, being secured to the transverse frame member 216, so as to strip the fibrous material from engagement with the toothed feed chains at the rear extremities of the latter. These feed chains are mounted at their rear extremities on sprocket wheels 24 fixed to the shaft 23 already described; and their forward extremities are supported upon the peripheries of similar sprocket wheels 224 rotatively supported upon stub shafts 225, each of which is supported in parallel relation to the axes of the rolls 67 and 71 and shaft 23, by means of a bracket 226 fixed to the oblique front main lower feed table member 227, as shown in Figs. 10, 11 and 12. The oblique member 227 extends along and forms the bottom of the front oblique margin of the main lower feed table, and is supported at its forward end by means of a leg or frame member 228, its rear end being connected with the end of the rear transverse bottom frame member 216, on the opposite side of the machine and feed table. The diagonal lower feed-chain-supporting member 227 is thus below the level of and in parallel relation to the oblique front stock-delivering edge 218 of the top feed table or platform, and in advance of the latter, so as to support the sprockets 224 in an oblique row directly beneath and, by preference, slightly in advance of said edge 218, so that the forward extremities of the chains are in position to receive stalks arranged in oblique relation to the feed chains, and delivered to the latter over the diagonal front stalk-delivering edge 218 of the top feed table or platform. The stalks thus deposited upon and in oblique relation to the feed chains are carried by the latter rearward between the upper platform 217 and the main lower feed table 214, to the transverse rolls at the rear end of the feed table; the toothed feed-chains 29 being, by preference, of unequal lengths and arranged side by side in parallel relation and in progressive order corresponding with their differences in length so that the front extremities of the feed chains are at unequal distances from the forward transverse rolls 67 and 71 corresponding with or according to the different lengths of said feed chains.

An opening or openings 229 in the lower main feed table permits the forward extremity of the feed chains to pass from the bottom side of the main lower feed table to the top side of the latter, as the chains are operated in such a manner as to cause the top laps to pass rearward between the upper and lower feed table members 217 and 214.

A diagonal or oblique shaft 230 is supported above and in parallel relation to the lower forward diagonal frame member 227, by means of bearings 231, 231. These journal bearings are fixed to or may be formed integral with shaft-supporting brackets 232 which are attached to the forward diagonal margin of the main lower table or bottom member 227 already described. This shaft is operatively connected with a suitable driving means which may consist of any desired one of the axles 68 of the lower transverse rolls 67 already described, operatively connected with the shaft 23, by means of a sprocket 232' on the axle 68, a sprocket 233 fixed to the shaft 23, a chain 234 upon and connecting said sprockets, a second sprocket 235 fixed to the shaft 23, a sprocket 236 fixed to a stub shaft 237, and a sprocket chain 238 upon and connecting said last mentioned sprockets; and a bevel gear wheel 239 fixed to the inner end of said stub shaft and in toothed engagement with a similar bevel gear 240 fixed to the adjacent rear extremity of the shaft 230.

The stub shaft 237 is journaled in a suitable bearing 241 upon a bracket 242; and the adjacent end of the shaft 230 is journaled in a similar bearing 243 upon said bracket 242, the bracket being attached to or forming a part of the bracket member 222 secured to or forming an extension of the bracket 14 already described.

Peripherally toothed quantity regulating wheels 244 are fixed to the rotative shaft 230 which is located in advance of and in parallel relation to the fiber-delivering front diagonal edge 218 of the top feed table 217; said wheels 244 being spaced apart from the edge 218 a sufficient distance to permit stalks of fibrous material laid upon the table 217 and fed over its edge 218 to pass between said quantity regulating wheels and said diagonal stalk-delivering table edge, and onto and in position to extend diagonally of the top laps of the toothed feed chains 29, in suitably regulated quantities, the quantity of stalks thus delivered onto the feed chains being regulated by and depending upon the size of the opening or space between the front diagonal or oblique stalk-delivering edge of the top feed table or platform 217 and said wheels 244, and upon the position of upright, preferably curved stalk guiding quantity-regulating guard arms 255 mounted adjacent to the wheels 244 in such position that the curved guard arms extend rearward over the shaft 230 and between said shaft and the adjacent stalk-delivering oblique edge 218 of the top feed table 217. These rear upwardly and downwardly extending arm portions or guard arms 256 are thus in position and so constructed and arranged as to enable the effective area of the space between said guard arms or guiding members and the diagonal front edge 218 of the top platform 217 to be controlled by adjusting said guard arms upon their support to any desired position or to any suitable distance from the edge 218; and it is also plain that by adjusting the guard arms so that their rear curved portions 256 are relatively near to the shaft 230, so that the peripheral teeth 257 will be exposed and extend rearwardly beyond the guard arms 256 to a relatively great extent, the quantity of fibrous material permitted to pass between the guard arms 256 and wheels 244 and the adjacent oblique front edge of the top feed table will be greater than when the guard arms are adjusted to a position relatively farther from the rear side of the shaft 230 and close to the edge 218 of the feed table or platform. In order to permit of the adjustment of the guard arms 255 to regulate the position of their rear portions 256 with respect to the wheels 244 and the adjacent edge of the feed table 217, it is only necessary to provide the guard arm with an elongated slot 258—see Fig. 13—and secure each of said guard arms to a supporting bracket 259 by means of a headed screw 260 which extends through said elongated slot and is anchored in said bracket, the bracket being fixed to the diagonal frame member 227 by means of screws or other ordinary securing means.

To enable the quantity of stalks of fibrous material fed onto the chains 29 to be further regulated with facility during the operation of the machine, and in an efficient manner, an adjustable oblique or diagonal stalk-engaging guard member in the form of a flat strip 261 is slidably mounted upon or supported adjacent to and, by preference in sliding engagement with the bottom of the diagonal stalk delivering margin or edge portion 218, in such a manner that said strip may be readily moved forward and rearward with respect to said edge 218, so as to increase or diminish the effective area of the space between the upright curved guide arms, guides or stops 256 and said diagonal edge of the top platform 217. A supporting strip 262 supported in position on the top feed table or platform by means of screws 263 or other suitable ordinary securing means, is adapted to slidably support the stalk guiding strip or guard member 261 in operative position, and in any position into which the latter is moved or adjusted. Any suitable means may be employed for adjusting the strip 261 to the desired positions for controlling and regulating the quantity of stalks passing between the wheels 244 and their guard arms, on the one hand, and the diagonal edge 218 of the top feed table, or, in other words, through the space between said guard arms and said table edge, or between the said wheels and said table edge. For this purpose a rock shaft 264 is rotatively mounted in suitable journal bearings 265 fixed to the diagonal strip 262, and provided with a laterally projecting arm or finger 266 fixed to said rock shaft and extending into a suitable aperture or socket 267 in the slidable guard or guiding strip 261, and adapted to move the latter forward or back as the shaft with its arm or arms 266 is turned toward the right or left, or in a direction to move the arms or finger 266 forward or rearward. An operating crank arm 267' is fixed to the projecting end of the shaft 264, in position to be convenient for use in rocking the shaft in the operation of adjusting or moving the guard strip 261 forward or backward with respect to the diagonal fiber-delivering forward edge of the top feed table or platform.

By moving the slidable guard strip 261 forward so that its forward edge projects forward beyond the adjacent edge of the top feed platform the effectual area or space between the stops or guard arms 256 and the stalk delivering diagonal edge of the top feed table is decreased, and by moving said strip rearward from such forward position, the space or effective area for permitting the stalks to pass onto the feed chains is increased. The quantity of stalks permitted to pass onto the feed chains may thus be regulated and controlled in an efficient manner and with facility by simply rocking the shaft 264 in the required direction, thereby moving the guard strip 261 to any desired adjusted position, and enabling it to be held in any position to which it is adjusted or moved.

I claim:

1. In a machine of the class described, the combination of a plurality of rotary fiber-treating members having peripheral ribs extending longitudinally thereof and adapted to engage stalks of fibrous material to be operated upon, a series of feed chains mounted adjacent to the rotary peripherally ribbed fiber-treating members and adapted to feed stalks of fibrous material to the same, a series of feed chains extending at an angle with respect to and adapted to deliver stalks in position to be engaged by the first-mentioned series of feed chains and in angular relation to the axes of the peripherally ribbed rotary fiber-treating members, means for regulating the quantity of stalks delivered to the first-mentioned series of feed chains, and means for operating the feed-chain mechanism and peripherally ribbed rotary fiber-treating members.

2. In a machine of the class described, the combination of a plurality of peripherally ribbed rotary fiber-treating members, a series of feed chains mounted adjacent to the peripherally ribbed rotary fiber-treating members, for feeding stalks of fibrous material to the same, a series of feed chains extending at an angle with respect to the first mentioned series of feed-chains, and adapted to deliver stalks to the latter and in oblique relation to the axes of the rotary peripherally ribbed fiber-treating members, a stock-guiding member mounted in position to extend between said first mentioned series of feed chains and said second mentioned series of feed chains and adapted to permit the passage of stalks in suitable regulated quantities to the first mentioned series of feed chains, and means for operating the feed chain mechanism and peripherally-ribbed rotary fiber-treating members.

3. In a machine of the class described, the combination of a plurality of ribbed rotary fiber-treating members, a plurality of endless feed-chains of unequal length having their rear extremities adjacent to and adapted to deliver fibrous material to said rotary fiber-treating members, the forward extremities of said feed-chains being located at different distances from the rotary fiber-treating members progressively in the order of the relative lengths of said chains, and means for delivering stalks of fibrous material in position to be engaged by and in oblique relation to the forward portions of said feed chains, and in oblique relation to the axes of said rotary fiber-treating members.

4. In a machine of the class described, the combination of a plurality of peripherally ribbed rotary fiber-treating members, a plurality of endless feed-chains of unequal length having their rear extremities adjacent to and adapted to deliver stalks of fibrous material to said rotary fiber-treating members, the forward extremities of said feed chains being arranged at different distances from the rotary fiber-treating members progressively in the order of the relative lengths of said chains, a series of endless feed chains extending at an angle with respect to and adapted to deliver stocks of fibrous material in position to be engaged by and in oblique relation to the path of movement of the fiber-engaging portions of said first mentioned plurality of feed chains and in oblique relation to the axes of said rotary fiber-treating members, and means for operating the peripherally ribbed rotary fiber treating members and feed chain mechanism.

5. In a machine of the class described, the combination of a plurality of peripherally ribbed rotary fiber-treating members, a plurality of endless feed chains of unequal lengths having their rear extremities adjacent to and adapted to deliver material to the peripherally ribbed rotary fiber-treating members, the forward extremities of said feed chains being arranged at different distances from the rotary fiber-treating members progressively in the order of the relative lengths of said chains, a feeding platform having a stalk-delivering margin adjacent to and adapted to deliver stalks in position to be engaged by the forward portions of said feed chains and in oblique relation to the path of movement of the fiber-engaging portions of the feed chains and in oblique relation to the axes of said peripherally ribbed rotary fiber-treating members, and means for operating the rotary fiber-treating members and feed chains.

6. In a machine of the class described, the combination of a plurality of peripherally ribbed rotary fiber-treating members, a series of endless feed chains of unequal lengths having their rear extremities adjacent to and adapted to deliver fibrous material to the peripherally ribbed rotary fiber-treating members, the forward extremities of said feed chains being arranged at different distances from the rotary fiber-treating members progressively in the order of the relative lengths of said chains, a series of endless feed chains extending at an oblique angle with respect to the first mentioned series of feed chains and adapted to deliver stalks in position to be engaged and fed rearward by and in oblique relation to the path of movement of the fiber-feeding portions of the same, quantity regulating means located intermediate the two series of feed chains, and means for operating the peripherally ribbed rotary beater mechanism and feed-chain mechanism.

7. In a machine of the class described, the combination of a plurality of peripherally ribbed rotary fiber-treating members, a plurality of endless feed-chains of unequal lengths having their rear extremities adjacent to and adapted to feed stalks of fibrous material in position to be operated upon by said ribbed rotary fiber-treating members, the forward extremities of said feed chains being located at different distances from the rotary fiber-treating members progressively in the order of the relative lengths of said chains, a feeding platform having a stalk-delivering margin adjacent to and adapted to deliver stalks in position to be engaged by the forward portions of said feed chains, and in oblique relation to the axes of said peripherally ribbed rotary fiber-treating members, quantity regulating means located intermediate the platform and said feed-chains, and means for operating the peripherally ribbed rotary fiber-treating mechanism and feed chains.

8. In a machine of the class described, the combination of a plurality of peripherally ribbed rotary fiber-treating members, a plurality of endless feed chains of unequal lengths having their rear extremities adjacent to the peripherally ribbed rotary fiber-treating members and adapted to feed fibrous material to the same, the forward extremities of said feed chains being located at different distances from the rotary fiber-treating members progressively in the order of the relative lengths of said chains, rotary quantity-regulating mechanism arranged adjacent to the forward extremities of said feed chains, and means for delivering stalks in position to be engaged by said quantity-regulating mechanism and in oblique relation to the axes of the ribbed rotary fiber-treating members.

9. In a machine of the class described, the combination of a plurality of peripherally ribbed rotary fiber-treating members, a plurality of endless feed-chains of unequal lengths mounted in front of said rotary fiber-treating members and having the forward extremities located at different distances from the rotary fiber-treating members progressively in the order of the relative lengths of said chains, a feeding platform, rotary quantity-regulating mechanism arranged intermediate the stalk-delivering margin of said platform and the feed-chains, and means for operating the rotary fiber treating members and feed chain mechanism, and rotary quantity-regulating mechanism.

10. In a machine of the class described, the combination of a main frame, a rotative beater rotatively mounted in the main frame and having longitudinal peripheral beater ribs, the downwardly moving side of said rotary beater being uncovered and exposed in position to engage transversely disposed unconfined fibrous material to be fed lengthwise of said rotary beater, flexible feeding mechanism extending longitudinally of the rotary beater and adapted to feed fibrous material lengthwise of the same, and in position to be operated upon by the downwardly moving side of said beater, a shield extending over the upwardly moving side of the beater and adapted to extend beneath and supporting engagement with fibrous material passing over the upwardly moving side of said beater on one side of said flexible feeding mechanism, and means for operating the flexible feeding mechanism and rotary beater.

11. In a machine of the class described, the combination of a main frame, a rotary beater mounted in the main frame and having longitudinal peripheral beater bars, flexible feeding mechanism extending longitudinally of the rotary beater and adapted to feed transversely disposed fibrous material lengthwise of the beater and in position to be operated upon by the downwardly moving side of said beater, a shield extending outward laterally and downward and rearward at an angle over the forward portion of the downwardly moving side of said beater from the top longitudinal central portion of the latter, leaving the downwardly moving side of the beater located rearward from said shield exposed and in position to engage fibrous material to be fed lengthwise of the beater, a shield extending over the upwardly moving side of said beater from end to end thereof and adapted to extend beneath and in supporting engagement with fibrous material passing over said upwardly moving side of said beater, and means for operating the flexible feeding mechanism and rotary beater.

12. In a machine of the class described, the combination of a main frame, a rotary beater mounted in the main frame and having longitudinal peripheral beater bars, the downwardly moving side of said rotary beater being exposed in position to engage transversely disposed fibrous material to be fed lengthwise of said rotary beater, stalk-breaking mechanism mounted forward of the rotary beater, flexible feeding mechanism extending longitudinally of said rotary beater and adapted to feed fibrous material lengthwise of the same and in position to be operated upon by the downwardly moving side of said beater, a shield extending over the upwardly moving side of the rotary beater and adapted to extend beneath and in supporting engagement with fibrous material passing over said upwardly moving side of the beater on one side of said flexible feeding mechanism, means for operating the flexible feeding mechanism and rotary beater, and means for cleaning the fibrous material passing over said upwardly moving side of the beater as said material is fed rearward from the rear extremity of the shield.

13. In a machine of the class described, the combination of a main frame, a rotary beater mounted in the main frame and provided with longitudinal peripheral beater bars, the downwardly moving side of said rotary beater being exposed in position to engage and operate upon transversely disposed fibrous material to be fed lengthwise of said rotary beater, a shield extending over the upwardly moving side of said rotary beater and adapted to extend under and in supporting engagement with fibrous material passing over said upwardly moving side of said rotary beater, flexible feeding mechanism extending longitudinally of said rotary beater and adapted to feed fibrous material lengthwise of the beater and in position to cause the portion of such fibrous material passing over the upwardly moving side of the beater to extend over the shield and out of engagement with the upwardly moving side of said beater while the portion of said fibrous material located on the opposite side of said flexible feeding mechanism is being fed longitudinally of and engaged and operated upon by the downwardly moving side of the beater, a rear rotary beater having its forward end overlapped by the rear extremity of said shield, and means for feeding fibrous material passing over and discharged from said shield into position to be engaged and operated upon by said rear rotary beater.

14. In a machine of the class described, the combination of a pair of rotary beaters rotatively mounted in end to end relation and having their adjacent ends in substantially concentric relation, means for rotating said rotary beaters in opposite directions respectively, flexible feeding mechanism extending longitudinally of and adapted to feed transversely disposed fibrous material from end to end of said beaters and in position to be engaged and operated upon by the downwardly moving sides of said beaters successively, and means for supporting the fibrous material out of contact with the upwardly moving sides of said beaters while the portions of the fibrous material passing over the downwardly moving sides of the beaters is in position to be engaged and operated upon by the latter.

15. In a machine of the class described, the combination of a pair of rotary beaters rotatively mounted in end to end relation to each other, means for rotating said beaters simultaneously in opposite directions, a flexible feed chain extending longitudinally of and adapted to feed transversely disposed fibrous material lengthwise of and in position to be engaged by the downwardly moving side of the front rotary beater, a rear feed chain mounted in offset relation to the first mentioned feed chain and extending lengthwise of the rear rotary beater, the forward extremity of the rear feed chain being located forward with respect to and laterally of the rear extremity of the front one of said feed chains, shields extending over the upwardly moving sides of said rotary beaters and adapted to extend under and support the portion of the fibrous material passing over the upwardly moving sides of the beaters out of contact with the beaters while the portion of the material passing over the downwardly moving sides of the beaters is in position to be engaged and operated upon by the downwardly moving sides of the beaters respectively, tracks extending lengthwise of the beaters and adjacent to the fiber-engaging portions of said feed chains, and adapted to engage fibrous material extending between the chains and tracks, and means for operating the feed-chains.

16. In a machine of the class described, the combination of a main frame, a pair of rotary beaters rotatively mounted in the frame and in end to end relation to each other, the adjacent ends of said rotary beaters being spaced apart, a flexible feed chain extending longitudinally of and adapted to feed transversely disposed fibrous material lengthwise of and in position to be engaged by the downwardly moving side of the front rotary beater, a rear feed chain mounted in offset relation to the first mentioned feed chain and extending lengthwise of the rear rotary beater, the forward extremity of the rear feed chain being located forward with respect to and laterally of the rear extremity of the front one of said feed chains, a shield extending over the upwardly moving side of the front rotary beater and rearward over the front extremity of the downwardly moving side of the rear rotary beater, tracks extending lengthwise of the beaters in parallel relation to the fiber-engaging laps of said feed chains and adapted to engage fibrous material extending between the chains and tracks, means for operating the feed chain mechanism, and means for rotating said rotary beaters simultaneously in opposite directions.

17. In a machine of the class described, the combination of a main frame, a pair of rotary beaters rotatively mounted in the main frame and in end to end relation to each other, the adjacent ends of said beaters being spaced apart, means for rotating said beaters in opposite directions simultaneously, a flexible feed chain extending longitudinally of and adapted to feed fibrous material lengthwise of and in position to be engaged by the downwardly moving side of the front one of said beaters, a rear feed chain mounted in offset relation to the first mentioned feed chain and extending lengthwise of the rear rotary beater, the forward extremity of the rear feed chain being located forward with respect to and at one side of the rear extremity of the forward feed chain, a shield extending over the upwardly moving side of the front rotary beater and rearward over the front extremity of the downwardly moving side of the rear rotary beater, a shield extending over the upwardly moving side of the rear rotary beater and forward beyond and on the inside of the rear extremity of the downwardly moving side of the front one of said rotary beaters, tracks extending lengthwise of the beaters and in parallel relation to the fiber-engaging laps of said feed chains and adapted to engage fibrous material extending between the chains and tracks, and means for operating the feed-chain mechanism.

18. In a machine of the class described, the combination of a plurality of rotary fiber-treating members, a series of feed chains located in front of and extending at angle with respect to the axes of said rotary fiber-treating members, the forward fiber-engaging extremities of said feed chains being mounted upon rotary supporting members arranged in a row oblique to the axes of the rotary fiber-treating members, means for delivering stalks of fibrous material in position to be engaged by the feed chains and in oblique relation to the axes of said rotary fiber-treating members, and means for operating the rotary fiber-treating members and feed chain mechanism.

19. In a machine of the class described, the combination of a plurality of fiber-treating rolls rotatively mounted and adapted to admit stalks of fibrous material between the adjacent peripheries thereof, flexible feeding mechanism located forward of and adapted to feed stalks of fibrous material into position to pass between said rolls, means for feeding stalks of fibrous material into position to be engaged and fed rearward by said flexible feeding mechanism, a rotary beater located rearward with respect to and having its axis at an angle with respect to the axes of said rolls, and adapted to operate upon material passing rearward from between said rolls, a shield extending over the downwardly moving side of said rotary beater and having its rear margin disposed at an oblique angle with respect to the axis of said beater, the forward upper margin of said shield being in engagement with the rear downwardly moving peripheral surface of the lower one of said rolls, and means for operating the rotary beater mechanism and rolls.

20. In a machine of the class described, the combination of a series of fiber-treating rolls rotatively mounted, and adapted to admit stalks of fibrous material between the adjacent peripheries thereof, means for feeding fibrous material into position to pass between said rolls, a rotary beater rotatively mounted back of and having its axis disposed at an angle with respect to the axes of said rolls, a curved shield extending over and covering the upwardly moving side of said rotary beater, an angular shield extending over the forward extremity of the downwardly moving side of said rotary beater, feeding mechanism extending over and lengthwise of said rotary beater, and adapted to feed material from the rolls into position to pass from end to end of the rotary beater and in engagement with the downwardly moving side of the latter, and means for operating said feeding mechanism, rolls and rotary beater mechanism.

21. In a machine of the class described, the combination of a plurality of transverse fiber-engaging rolls journaled in suitable bearings and adapted to admit stalks of fibrous material between the adjacent peripheries thereof, means for feeding fibrous material into position to pass between said transverse rolls, a rotary beater provided with longitudinal peripheral beater ribs mounted back of and having its axis at an angle with respect to the axes of said transverse rolls, a fiber-supporting shield extending over the upwardly moving side of said rotary beater, feeding mechanism extending over and lengthwise of the rotary beater and adapted to feed fibrous material passing from between the transverse rolls into position to extend transversely over the rotary beater and to cause said material to pass along lengthwise of the rotary beater and in engagement with the downwardly moving side of the same on one side of the feeding mechanism, and in engagement with said shield and out of contact with the beater on the opposite side of said feeding mechanism, and means for operating the transverse rolls, rotary beater and feeding mechanism.

22. In a machine of the class described, the combination of a plurality of transverse fiber-engaging rolls rotatively mounted and adapted to admit stalks of fibrous material between the peripheries thereof, means for feeding fibrous material into position to pass between said transverse rolls, a rotary beater provided with longitudinal peripheral beater ribs mounted back of and having its axis at an angle with respect to the axes of said transverse rolls, a fiber-supporting shield extending over the upwardly moving side of said rotary beater, feeding mechanism extending over and lengthwise of the rotary beater and adapted to feed fibrous material passing from between the transverse rolls into position to be engaged by the downwardly moving side of the rotary beater on one side of the feeding mechanism and in engagement with the top side of the shield and out of engagement with the upwardly moving side of the beater on the opposite side of said beater, and acting to feed the fibrous material progressively from end to end of said rotary beater, means for treating the fibrous material located on the side of the feeding mechanism on which the upwardly moving side of the beater is located, and means for operating the transverse rolls, feeding mechanism and rotary beater.

23. In a machine of the class described, the combination of a plurality of transverse fiber-engaging rolls rotatively mounted and adapted to admit stalks of fibrous material between the peripheries thereof, a rotary beater provided with longitudinal peripheral beater ribs mounted back of and having its axis at an angle with respect to the axes of the transverse rolls, a fiber-supporting shield mounted in position to extend over the upwardly moving side of said rotary beater, feeding mechanism extending over and lengthwise of the rotary beater and adapted to feed transversely disposed fibers from end to end of and in position to be engaged by the downwardly moving side of said beater, on one side of the feeding mechanism, and in engagement with said shield and out of engagement with the beater on the opposite side of the feeding mechanism, an angular shield mounted in position to extend outward and downward and rearward at an angle over the forward extremity of said rotary beater, said angular shield having its forward top edge in engagement with the rear downwardly moving peripheral surface of the rear transverse roll, and means for operating the transverse rolls, feeding mechanism and rotary beater.

24. In a machine of the class described, the combination of a plurality of transverse fiber-engaging rolls rotatively mounted and adapted to admit stalks of fibrous material between the peripheries thereof, a plurality of rotary beaters arranged in end to end relation and spaced apart at their adjacent ends, means for rotating said beaters in opposite directions respectively, feeding mechanism extending over and from end to end of said oppositely rotating beaters and acting to feed fibrous material progressively from end to end of said rotary beaters and with the fibers in transverse relation to the beaters, a shield mounted in position to extend over the upwardly moving side of the forward one of said rotary beaters and rearward over the forward margin of the downwardly moving side of the rear one of said rotary beaters, a shield mounted on the opposite side of the feeding mechanism in position to extend over the upwardly moving side of the rear rotary beater, and having the forward margin of said shield so constructed and arranged as to extend forward beyond and on the inside of the rear end of the forward rotary beater, and means for operating said transverse rolls, and feeding mechanism.

25. In a machine of the class described, the combination of a plurality of transverse fiber-engaging rolls rotatively mounted and adapted to admit stalks of fibrous material between the peripheries and in oblique relation to the axes thereof, a plurality of rotary beaters arranged in end to end relation and having their adjacent ends spaced apart, each of said beaters comprising in its construction a series of longitudinal beater bars or ribs, means for rotating said beaters in opposite directions, flexible feeding mechanism extending over and from end to end of said oppositely rotating beaters, and acting to feed transversely disposed fibers from end to end of said beaters successively, a shield mounted in position to extend over the upwardly moving side of the forward one of said rotary beaters and rearward over the forward margin of the downwardly moving side of the rear one of said beaters, a similar fiber-supporting shield mounted on the opposite side of the feeding mechanism and extending over the upwardly moving side of the rear one of said rotary beaters and forward inside of the rear ends of the peripheral beater bars of the forward one of said rotary beaters, in position to receive fibrous material from said beater bars, a track member extending from between the transverse rolls rearward in position to support fibrous material passing from between the rolls, track mechanism extending longitudinally of the rotary beaters and connected with said first-mentioned track member and acting to guide fibrous material engaged by the flexible feeding mechanism, and means for operating the flexible feeding mechanism and transverse rolls.

Signed at Chicago, Illinois, this 30th day of November, 1918.

CHARLES E. ROBERTS.

Witnesses:
 HARRY I. CROMER,
 MARY F. ALLEN.